May 28, 1957  J. A. LAUCK  2,793,595
PRESSURE LOADED PUMP
Filed March 9, 1953
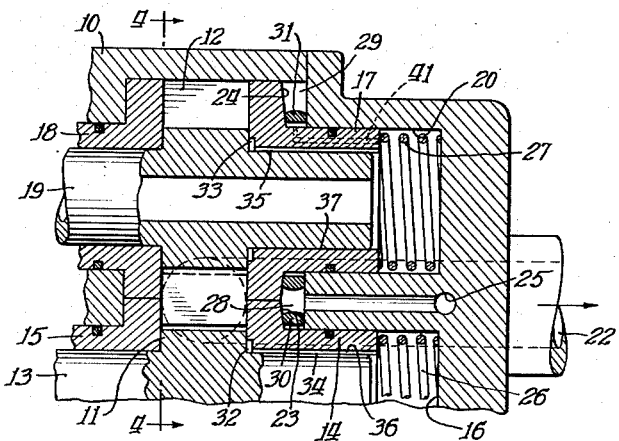
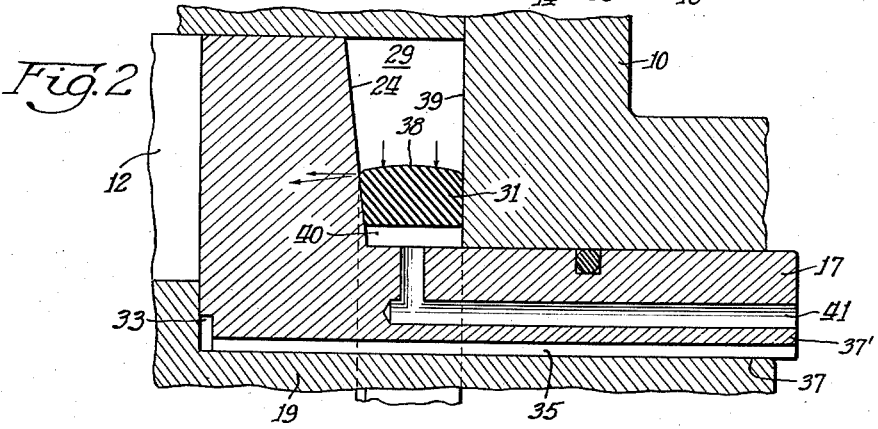
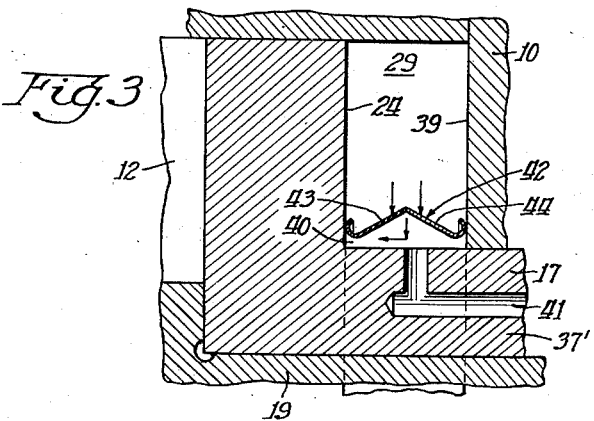
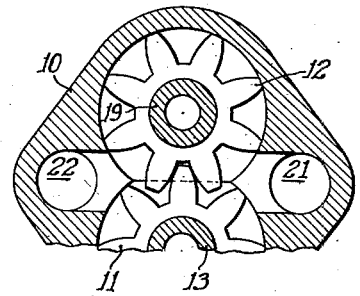
Inventor:
John A. Lauck
By: Joseph R. Dwyer
Atty.

United States Patent Office 2,793,595
Patented May 28, 1957

2,793,595

PRESSURE LOADED PUMP

John A. Lauck, Shaker Heights, Ohio, assignor to Borg-Warner Corporation, Chicago, Ill., a corporation of Illinois Application March 9, 1953, Serial No. 341,224

14 Claims. (Cl. 103—126)

This invention relates to a gear pump and more particularly to a gear pump of the type employing pressure loaded bushings, such gear pumps sometimes being referred to as pressure loaded pumps.

In a pressure loaded gear pump of the type including one set of axially movable pressure loadable bushings, a part of the discharge pressure generated by the pump is communicated to the rear or motive surfaces of the axially movable bushings to urge the bushings into sealing relationship with their associated gears. As described in the United States Patent No. 2,420,622 to Lauck et al., by carefully selecting the relative size of the forward surfaces and the rear or motive surfaces of the bushings, it is possible to control within very close limits the actual sealing pressure established during operation of the pump. Gear pumps, so constructed, are capable of delivering fluid at extremely high pressure with considerable volume.

The aforementioned control of the size of effective pressure areas of the forward surfaces of the bushings has been accomplished by forming annular recesses radially inwardly of the roots of the gear teeth in either the side faces of the gears or in the forward surfaces of the bushings. A satisfactory way of determining the proper size of these relief recesses is to successively remove small increments of metal, thereby gradually increasing the size of a particular relief recess until it is found, on assembly, that the bushings are held in close contact with the gear side faces at high pressure. Once the exact size has thus been determined for a bushing of any particular pump, then it becomes a mere matter of duplication.

However, it has been found possible to control the sealing pressure established during operation of the pump with a substantial reduction in the exactness heretofore required in selecting the area of the relief recesses, and under certain conditions, eliminate the recesses altogether by controlling and directing some of the components of force found in the chamber containing fluid pressure which is exerted against the rear or motive surfaces of the bushings. This has been accomplished by providing a resilient element within this chamber which will direct a component of the force, normally directed radially inwardly, in an axial direction, i. e., towards the motive surface of the bushing thus gaining from that normally radially inwardly directed force an additional increment of pressure exerted against the rear or motive surfaces of the bushings.

An object of the present invention is to provide a new and improved pressure loaded type intermeshing gear pump wherein the sealing pressure of the pressure loadable bushings can be carefully regulated without the provision of relief recesses, or at least a substantial reduction in the tolerances required for the relief recesses.

A further object of this invention is to provide a new and improved pressure loaded type intermeshing gear pump wherein a component of the force in the motive pressure chambers normally directed radially inwardly towards the tubular portion of the bushing and which component normally contributes no force towards the motive pressure surface area of the bushing can be directed to provide an additional increment of pressure to the motive pressure responsive surface.

A still further purpose of this invention is to provide a new and improved pressure loadable type intermeshing gear pump wherein a resilient member of generally annular configuration is disposed within the motive pressure chamber in such a manner that this resilient member responds to the force normally directed radially inwardly and directs a component of this force axially thus becoming an additional increment of pressure exerted by the bushing against the gear side faces.

In accordance with one embodiment of this invention, each of the pressure responsive bushings of the pressure loaded type intermeshing gear pump have an annular resilient element located in its motive chamber. The motive or fluid pressure responsive surface of the bushing is inclined with respect to the axis of the pump and cooperates with this annular resilient member so that a component of the force or motive pressure normally acting radially inwardly towards the axis of the pump is directed, through cooperation of the resilient member and the inclined surface of the bushing, in an axial dimension thus giving an additional increment of axial pressure to the pressure loaded bushings.

In the second and preferred embodiment of this invention, a resilient, annular metal ring with inclined surfaces is disposed within the motive pressure chamber of the pump so that the force or motive pressure normally directed radially inwardly towards the axis of the pump acts upon the inclined surfaces of the ring to cause expansion of the lateral dimension thereof with a resultant component of force directed axially. This gives the motive or pressure responsive surfaces of the bushings an additional increment of pressure normally not obtainable from the liquid pressure in the motive pressure chambers.

Other objects and advantages of the present invention will be apparent from the following detailed description taken in conjunction with the drawings wherein:

Fig. 1 is a fragmentary, axial, sectional view of the pressure loaded type intermeshing gear pump constructed in accordance with one embodiment of this invention;

Fig. 2 is a fragmentary, enlarged axial view showing to advantage the detailed arrangement of the first embodiment of this invention;

Fig. 3 is an enlarged, fragmentary sectional view showing to advantage the second and preferred embodiment of this invention with a schematic vector diagram showing the forces involved; and Fig. 4 is a cross sectional view taken substantially along line 4—4 of Fig. 1.

Referring to the drawing, numeral 10 denotes a suitably chambered pump housing in which are rotatably mounted a driven gear 11 and an intermeshing gear 12. Driven gear 11 is supported on a shaft 13 journalled on its right side through a pressure responsive, axially movable, flanged bushing 14 and on its left side through a fixed flanged body bushing 15. The gear 11 and associated bushings 14 and 15 are arranged in a first chamber 16 formed in the pump housing 10 with sufficient clearance between the right end and the adjacent wall of the housing to permit axial movement of the bushing 14. Similarly, the driven gear 12 has disposed on the right side, a pressure responsive, axially movable, flanged bushing 17 and on its left side a fixed flanged body bushing 18. Driving shaft 19, upon which gear 12 is mounted, is journalled through the bushings 17 and 18 and may be suitably connected to any driving means (not shown). The gear 12 and associated bushings 17 and 18 are located in a second chamber 20 formed in the housing adjacent and parallel to the chamber 16. Sufficient clearance is provided between the right end of the bushing 17 and the adjacent end wall of the housing to permit axial movement of the bushing 17.

As shown in Fig. 4, the housing has an inlet port or conduit 21 formed on its right side and an outlet port or conduit 22 formed on its left side. Pressure generated by the gears is communicated from the outlet or discharge port of the pump to the motive or pressure responsive surfaces 23 and 24 of the axially movable bushings 14 and 17 through a passage 25 communicating with the discharge conduit 22. It is to be understood that this passage 25, as shown in Fig. 1, formed through the housing 10, is more or less of a schematic character, and that in the usual pressure loaded pumps of the type to which this invention is directed, the discharge pressure is communicated to the motive surfaces of the bushing through an axially extending passage provided between the peripheries of the flanged portions of the bushings adjacent the discharge side of the pump at the point of convergence of the bushings, as taught in the aforementioned Lauck et al. Patent No. 2,420,622. For the sake of clearness, however, this passage is shown herein as merely a passage in the housing.

To provide an initial sealing relationship between the bushings and gear side faces, coiled compression springs 26 and 27 are disposed within the right ends of the chambers 16 and 20, respectively, so as to seat against the terminal end of the parallel tubular or barrel portions of the bushings 14 and 17 to urge the forward surfaces of these bushings into engagement with the gear side faces.

In the usual pressure loaded pump constructed in accordance with the teachings of the aforementioned Lauck Patent No. 2,420,622, relief recesses of annular configuration are formed in the radially inner portions of the forward or gear engaging surfaces of the pressure loaded bushings or in the gear side faces, and are placed in communication with a pressure lower than discharge pressure generated by the pump through channels or grooves extending axially along the bore of the bushings or through the clearance between the bore wall and the gear journals. These annular recesses control the effective pressure area of the pressure loaded bushings. In manufacture, the area or size of these relief recesses is often determined empirically by successively removing small increments of metal, thereby gradually increasing the size of the relief recess, until, upon assembly, the bushings are held in close contact with the gear faces at high pressure.

Otherwise stated, these relief recesses, the proper sizes of which are often best determined by the so-called "cut and try method," control the area of the flanged bushings, over which discharge pressure, tending to break the seal, is effective, in such a manner that this axial pressure resulting from the pressure generated by the pump acting against the gear side faces engaging surfaces of the bushings 14 and 17 and tending to produce axial movement of the bushings away from the gear side faces is effectively limited so that it may be slightly exceeded by the oppositely directed loading pressure communicated to the rear surfaces of the bushings. In this manner proper sealing engagement is maintained.

It is a purpose of the present invention to increase the allowable manufacturing tolerances of the forward surface recess size and under certain conditions to eliminate the face recess entirely and still provide suitable pressure loading of the axially movable bushings so that the desired sealing relationship between the bushing and the gears can be maintained. In accordance with one embodiment of this invention it is proposed that this be accomplished by disposing within the motive chambers 28 and 29 annular resilient members, such as 30 and 31, of rubber or rubber-like material which are then subject to the same pressure in a radial direction as the motive surfaces 23 and 24 of the bushings 14 and 17. By locating these members in wedging relation between the chamber end wall and the motive surface of the bushing, these annular resilient members will convert the radial component of force into an axially directed force which will be effective against the bushing motive surface.

In the embodiments shown in Figs. 1 and 2, the axially movable bushings 14 and 17 are formed with annular recesses 32 and 33. Axially extending passages or grooves 34 and 35 are formed in the bores 36 and 37 of the bushings adjacent the gear shafts 13 and 19 and place these relief recesses in communication with the right end portions or extensions of the chambers or bores 16 and 20. These right end portions or extensions communicate with the inlet port of the pump and are normally maintained at an intermediate pressure, i. e., a pressure less than the discharge pressure but greater than inlet pressure.

As more clearly shown in Fig. 2, the motive pressure chamber 29 of the axially movable bushing 17 is defined by the motive surface 24, one wall 38 of the resilient member 31 and the wall 39 of the housing 10. It will be noted that the radially inner side of the resilient member 31 is disposed a distance radially outwardly from the tubular portion 37' of the bushing to define a cavity 40 therebetween and is vented by a passage 41 to the right end portion of the chamber 20. As hereinbefore stated, this right end portion of the chamber 20 communicates with the inlet port of the pump and is normally maintained at an intermediate pressure. Consequently, this cavity 40 is maintained at a pressure lower than the pressure found in the motive pressure chamber, and a differential in pressure exists, during the operation of the pump, between the motive pressure chamber 29 and the cavity 40.

While this cavity 40 is shown in Fig. 2 as being vented to intermediate pressure by a passage in the bushing 17, it will be understood that the bushing 14 has the same feature associated therewith.

It will be understood that the force acting against the walls 24, 38 and 39 of the motive pressure chamber 29, because of the fluid pressure therein, is at a right angle to these walls and the force, acting radially inwardly, causes radial compression and axial expansion of the resilient member 31. Thus, through the radial compression and axial expansion of the resilient member 31 and the inclination of the pressure responsive motive surface 24 with respect to the axis of rotation of the gears, a component of the force acting radially inwardly or normal to the surface 38 being directed axially to supplement the force on the motive surface 24. Since this axial component is a trigonometric function of the force acting radially inwardly, it can be seen that by properly selecting the size of the resilient rubber-like element 31 and the inclination of the motive surface 24, the axial pressure of the axially movable pressure responsive bushings 14 and 17, can be effectively controlled in such a manner that the heretofore required preciseness in the size of the annular relief recesses on the forward or gear engaging surfaces of the bushings is substantially reduced. It is noted that in the enlarged detail shown in Fig. 2 the axial component of this radially directed force is larger than the component of the force directed radially inwardly and represents a substantial increase in axial pressure.

In the preferred embodiment of this invention, as shown in Fig. 3, an annular ring 42 of flat sheet-like metal, having cross sectionally flat sides 43 and 44 at an angle to each other which define an angle opening radially inwardly, is disposed within the motive pressure chamber 29 so that they are acted upon by the fluid under pressure therein. The same reference numerals are used in this embodiment as used in connection with the embodiment shown in Fig. 2 with the exception of the numerals 42, 43 and 44, and with the further exception of the numerals 33 and 35 are omitted and it is to be understood that although Fig. 3 shows the metallic ring 42 disposed adjacent the motive pressure surface of the axially movable bushing 17, there is a similar ring associated in like manner with the axially movable bushing 14. The radially inner side of the metallic ring 42 is disposed radially outwardly from the tubular portion 37 of the bushing in a manner similar to the embodiment shown in Fig. 2 to provide a cavity 40 which is vented to the right end portion of the chamber 20 containing intermediate pressure by the passage 41 and which provides a differential in pressure between the motive pressure chamber 29 and the cavity 40 during normal operation of the pump. However, in this embodiment the motive pressure responsive surface 24 of the axially movable bushing 17 is not inclined with respect to the axis of rotation of the gears. It will be understood that the force acting against the walls 24 and 39 of the motive pressure chamber 29, because of the fluid pressure therein, is at a right angle to these walls and the force acting radially inwardly can be considered to be acting at a right angle to the ring 42 as shown by the arrows in Fig. 3. This latter force causes the ring 42 to flatten and thereby to expand axially and is thus translated through operation of this expansion to an axial direction. Otherwise stated, because of the geometric shape of the ring, the two sides 43 and 44 increase the angle between them under pressure and a component of the force acting radially inwardly or normal to the ring 42 is directed axially to supplement the force on the motive surface 24. Since this axial component is a trigonometric function of the forces acting radially inwardly because of the angular sides 43 and 44, it can be seen that by properly selecting the angle between the sides of the annular ring within the motive pressure chamber, the axial pressure with which the pressure loaded bushings act against the gear side faces can be closely controlled. It is important to note, further, that in this embodiment, the axial thrust or pressure at which the forward surfaces of the bushings engage the adjacent gear side faces, gained from the translation or direction of a component of force directed radially inwardly to an axial direction, is, of course, sufficient to reduce the tolerance of preciseness heretofore required in the size of the annular relief recesses in the forward surfaces of the bushings, and can be sufficient, by proper selection of the shape of the ring, to eliminate these annular recesses entirely. Any relief of pressure deemed necessary on the forward surface of the bushings can be accomplished either by an axially extending passage, similar to passage 35 shown in Fig. 2, or by the looseness provided between the journals of the gears and the bore of the bushings. An example of the latter type bushing is shown in Fig. 3.

Where herein the various parts of this invention have been referred to as being located in the right or left position, it will be understood that this is done solely for the purpose of facilitating description and that such references relate only to the relative position of the parts as shown in the accompanying drawings.

While this invention has been described in detail in its exemplary forms or embodiments, it will be apparent to persons skilled in the art, after understanding the improvements, that various changes and modifications may be made therein without departing from the spirit or scope thereof.

I claim:

1. In a liquid pressure generating pump of the type including a housing containing intermeshing gears, axially movable bushings and fixed bushings, each of said bushings being radially outwardly flanged with a forward surface thereof engageable with the side faces of said gears and each having axially extending tubular portions of smaller diameter than said flanges, said axially movable bushings having back surfaces subject to discharge pressure to maintain sealing engagement with said gear side faces during operation of said pump, and means disposed against said back surfaces and said housing and subject to discharge pressure, said last mentioned means being axially expandable by said discharge pressure for directing a radial component of the force derived from the discharge pressure axially against the movable bushings to augment the axially directed force derived from the discharge pressure acting upon the movable bushings.

2. In a liquid pressure generating pump of the type including a housing containing intermeshing gears, axially movable bushings and fixed bushings, each of said bushings being radially outwardly flanged with a forward surface thereof engageable with the side faces of said gears and each having axially extending tubular portions of smaller diameter than said flanges, said axially movable bushings being subject to discharge pressure to maintain sealing engagement with said gear side faces during operation of said pump, and means for controlling the sealing engagement of said axially movable bushings with said gear side faces comprising an annular resilient ring member disposed against the side of the flange opposite the forward surface of the bushing and said housing and subject to discharge pressure whereby the radial component of force derived from said discharge pressure causes axial expansion of said ring to augment the sealing force derived from the discharge pressure acting upon the movable bushings.

3. In a liquid pressure generating pump of the type including a housing containing intermeshing gears, axially movable bushings and fixed bushings, each of said bushings being radially outwardly flanged with a forward surface thereof engageable with the side faces of said gears and each having axially extending tubular portions of smaller diameter than said flanges, said axially movable bushings being subject to discharge pressure to maintain sealing engagement with said gear side faces during operation of said pump, and means for controlling the sealing engagement of said axially movable bushings with said gear side faces comprising an annular resilient metallic ring having cross sectional flat sides disposed at an angle to one another, said ring disposed against the side of the flange opposite the forward surface of the bushing and said housing and subject to discharge pressure whereby the radial component of force derived from said discharge pressure causes axial expansion of said ring to augment the sealing force derived from the discharge pressure acting upon the movable bushing.

4. In a liquid pressure generating pump of the type including a housing containing intermeshing gears, axially movable bushings and fixed bushings, each of said bushings being radially outwardly flanged with a forward surface thereof engageable with the side faces of said gears and each having axially extending tubular portions of smaller diameter than said flanges, said axially movable bushings being subject to discharge pressure to maintain sealing engagement with said gear side faces during operation of said pump, and means for controlling the sealing engagement of said axially movable bushings with said gear side faces comprising an annular resilient metallic ring having sides disposed at an angle with respect to each other of angular cross section disposed against the side of the flange opposite the forward surface of the bushing and said housing and subject to discharge pressure whereby the radial component of force derived from said discharge pressure causes axial expansion of said ring by causing the angle between the sides of said ring to increase to augment the sealing force derived from the discharge pressure acting upon the movable bushing.

5. In an intermeshing gear pump, a housing having an inlet port and a discharge port formed therein, a pair of intermeshing gears journalled in said housing and arranged to force liquid from said inlet out of said housing through said outlet, a pair of flanged, axially movable bushings having forward surfaces adapted to engage the adjacent gear side faces in substantial sealing relationship, said flanged bushings also having back faces normally spaced from the adjacent end wall of the associated housing and cooperable with said housing to provide a pressure space, means establishing communication between said high pressure port and said pressure spaces whereby to subject said bushings to discharge pressure, and means to control the pressure at which the forward surfaces of said bushings engage the gear side faces comprising annular resilient metallic rings disposed in said pressure spaces in operative association with said back faces and said end wall and subject to said discharge pressure and so constructed and arranged whereby the radial component of force derived from said discharge pressure causes said ring to expand axially thus directing the radial component of the force derived from said discharge pressure axially to augment the sealing force derived from said discharge pressure against said back faces.

6. In an intermeshing gear pump, a housing having an inlet port and a discharge port formed therein, a pair of intermeshing gears journalled in said housing and arranged to force liquid from said inlet out of said housing through said outlet, a pair of flanged, axially movable, bushings having forward surfaces adapted to engage the adjacent gear side faces in substantial sealing relationship, said flanged bushings also having back faces normally spaced from the adjacent end wall of the associated housing and cooperable with said housing to provide a pressure space, means establishing communication between said high pressure port and said pressure spaces whereby to subject said bushings to discharge pressure, and mean disposed in said pressure spaces in operative association with said back faces and said adjacent end wall and subject to discharge pressure and so constructed and arranged whereby said discharge pressure causes said last mentioned means to expand axially thus directing a radial component of said discharge pressure axially to augment the sealing force derived from said discharge pressure acting against said back faces.

7. In an intermeshing gear pump, a housing having an inlet port and a discharge port formed therein, a pair of intermeshing gears journalled in said housing and arranged to force liquid from said inlet out of said housing through said outlet, a pair of flanged, axially movable, bushings having forward surfaces adapted to engage the adjacent gear side faces in substantial sealing relationship, said bushings also having back faces normally spaced from the adjacent end wall of the associated housing and cooperable with said housing to provide pressure spaces, means establishing communication between said high pressure port and the pressure spaces whereby to subject said bushings to discharge pressure, and means to control the pressure at which the forward surfaces of said bushings engage the gear side faces comprising annular resilient metallic rings each having sides disposed at an angle with respect to each other and disposed in said pressure spaces in operative association with said back faces and said adjacent end wall and subject to said discharge pressure whereby a radial component of force of said discharge pressure causes said ring to expand axially by causing the angle between the sides of said rings to increase thus directing said radial component of force of said discharge pressure axially to augment the sealing force derived from said discharge pressure against said back faces.

8. In an intermeshing gear pump, a housing having an inlet port and a discharge port formed therein, a pair of intermeshing gears journalled in said housing and arranged to force liquid from said inlet out of said housing through said outlet, a pair of flanged, axially movable, bushings having forward surfaces adapted to engage the adjacent gear side faces in substantial sealing relationship, said flanged bushings also having back faces on said flanges normally spaced from the adjacent end wall of the associated housing and cooperable with said housing to provide pressure spaces, means establishing communication between said high pressure port and the pressure spaces whereby to subject said bushings to discharge pressure, and means to control the pressure at which the forward surfaces of said bushings engage the gear side faces comprising annular resilient metallic rings disposed against the back faces of said flanges and against the adjacent end walls of the housing and subject to said discharge pressure whereby a radial component of force of said discharge pressure causes said ring to expand axially thus directing said radial component of force of said discharge pressure axially to augment the sealing force derived from said discharge pressure acting upon said back faces.

9. In an intermeshing gear pump, a housing having an inlet port and a discharge port formed therein, a pair of intermeshing gears journalled in said housing and arranged to force liquid from said inlet out of said housing through said outlet, a pair of flanged, axially movable, bushings having forward surfaces adapted to engage the adjacent gear side faces in substantial sealing relationship, said flanged bushings also having back faces on said flanges normally spaced from the adjacent end wall of the associated housing and cooperable with said housing to provide a pressure space, means establishing communication between said high pressure port and the pressure space whereby to subject said bushings to discharge pressure, and means to control the pressure at which the forward surfaces of said bushings engage the gear side faces comprising annular resilient metallic rings each having a pair of cross-sectionally flat sides disposed at an angle to one another, with one of said flat sides having a portion disposed in operative association with the back face of said flanges and the other in operative association with the end wall of the housing whereby pressure in the pressure chamber causes said sides to increase the angle therebetween thus directing a radial component of force of said discharge pressure axially to augment the sealing force derived from said discharge pressure acting upon said back faces.

10. A pump according to claim 9 wherein said bushings also have axially extending, reduced tubular portions and wherein said annular rings are disposed radially outwardly of the tubular portions of said bushings to define cavities between said tubular portions and said rings, said cavities being subject to intermediate pressure whereby the annular rings are allowed to expand because of the differential in pressure on either side of the rings.

11. In a pressure loaded rotary liquid displacement device of the type, including a housing, intermeshing gears received in said housing and adapted to force liquid from an inlet out of said housing through an outlet, means defining an axially adjustable bearing bushing having a radially extending flange formed with a pressure responsive surface for effecting a liquid seal engagement with one of said intermeshing gears, said bushings being formed with a reduced tubular extension received in a corresponding reduced bore in said housing, means communicating outlet pressure to said pressure responsive surface to effect said sealing engagement, and an annular resilient ring having flat side faces disposed at an angle with one another disposed in operative association with said pressure responsive surface and said housing and subject to said outlet pressure, whereby a portion of the outlet pressure adjacent said pressure responsive surfaces causes axial expansion of said ring by increasing the angle between said flat side faces to supplement the force on said pressure responsive surface to control the force with which the bearing bushing engages said intermeshing gear in sealing relationship.

12. A pressure loaded pump as claimed in claim 11 wherein the radially inward side of said annular ring is vented to an intermediate pressure zone resulting in a differential of pressure between said radially inner side and the side exposed to discharge pressure during normal operation of the pump.

13. A high pressure pump including a body providing a pumping cavity with an inlet and an outlet, a pumping element in said pumping cavity, bearing means for said pumping element, said bearing means defining one end wall of said pumping cavity, said bearing means further having an end plate portion and tubular bearing portion, said bearing means and said body together forming a motive pressure chamber behind said end plate portions, means providing a passage in communication with the pump discharge and the motive pressure chamber, and resilient means disposed in said motive pressure chamber against said end plate portions and said body whereby pressure forces in said motive pressure chamber cause said resilient means to expand axially and wedge against said end plate portions and said body thus directing radial components of forces of said discharge pressure axially to augment the sealing force derived from said discharge pressure acting upon said end plate portion.

14. In a high pressure pump, a housing having an inlet and an outlet and providing a pumping chamber, a backing plate for said pumping chamber in said housing, said backing plate having a pressure receiving back surface forming together with means including a portion of said housing a pressure control chamber, means placing said pressure control chamber in pressure communication with said outlet, and means disposed against said pressure receiving back surface and said housing and subject to the pressures in said pressure control chamber whereby radial components of force of said pressures cause said means to expand axially thus directing said radial components of force of said outlet pressure axially to augment the force derived from the outlet pressure acting upon said force receiving back surface.

References Cited in the file of this patent

UNITED STATES PATENTS

| | | |
|---|---|---|
| 465,907 | Whipple | Dec. 29, 1891 |
| 1,927,395 | Edwards | Sept. 19, 1933 |
| 2,044,873 | Beust | June 23, 1936 |
| 2,627,232 | Lauck | Feb. 3, 1953 |